United States Patent [19]

Russell et al.

[11] 4,337,114

[45] Jun. 29, 1982

[54] NODULAR COPPER REMOVAL FROM ALUMINUM FOIL SURFACES

[75] Inventors: Philip G. Russell; Walter J. Bernard; Sidney D. Ross, all of Williamstown, Mass.

[73] Assignee: Sprague Electric Company, North Adams, Mass.

[21] Appl. No.: 202,027

[22] Filed: Oct. 29, 1980

[51] Int. Cl.$^3$ .................................................. B44C 1/22
[52] U.S. Cl. .................................. 156/656; 156/666; 252/79.1; 252/79.2
[58] Field of Search ............... 156/656, 666; 252/79.1, 252/79.2

[56] References Cited

U.S. PATENT DOCUMENTS

| | | | |
|---|---|---|---|
| 2,168,909 | 8/1939 | Mason | 148/8 |
| 2,795,490 | 6/1957 | Newman et al. | 41/42 |
| 3,281,293 | 10/1966 | Woodring | 156/22 |
| 3,399,090 | 8/1968 | Caropreso et al. | 156/66 |
| 3,600,245 | 8/1971 | Gates | 156/22 |
| 3,728,237 | 4/1973 | Heijenbrok et al. | 204/129.75 |

FOREIGN PATENT DOCUMENTS 45-22602  4/1970  Japan .................................. 252/79.2

OTHER PUBLICATIONS

A. M. Lore, "Cleaning Copper Chemically-A Comparison", Insulation/Circuits 26, #3:41-44 (Mar. 1980).

*Primary Examiner*—George F. Lesmes
*Assistant Examiner*—Beverly K. Johnson
*Attorney, Agent, or Firm*—Connolly and Hutz

[57] ABSTRACT

Nodular copper is dissolved from aluminum foil surfaces by contacting the aluminum with a 0.1 to 2 M ammonium persulfate solution. The contacting temperature is 20° to 40° C., preferably 30° C., and the contacting time is 1 to 10 minutes, preferably 2 minutes.

6 Claims, 4 Drawing Figures

NODULAR COPPER REMOVAL FROM ALUMINUM FOIL SURFACES

BACKGROUND OF THE INVENTION

This invention relates to the removal of nodular copper from aluminum foil surfaces, particularly etched aluminum capacitor foil, by contacting the aluminum with a solution of ammonium persulfate.

When aluminum foil is etched for use in capacitors, a thin uniform film of copper appears on the foil surface. Scanning electron microscopy (SEM) and electron microprobe analysis have revealed that for the most part the copper is present as a monolayer, but sometimes copper nodules are also present.

Since aluminum foil contains some copper, copper as well as aluminum will dissolve during the etching of aluminum foil. The copper that is present in small amounts in the foil is dissolved in the treating solutions and then redeposited on the foil surfaces. These deposits take the form of extremely thin films, even as thin as a monolayer, and spherical or irregular nodules. It was believed that the occurence of copper nodules on the foil surface might be related to copper ion concentration in the etch solution.

It was found that copper originating from the foil itself redeposited as an atomic monolayer on the foil surface. However, deposition of the monolayer was not always complete, as the amount of copper redeposited is dependent on the copper content of the foil; a large fraction of such dissolved copper is redeposited at the foil-solution interface. When the copper ion concentration in solution reached a high level, copper deposited as nodules on the foil surface.

Nitric acid washes have been used in the prior art to remove copper from the surface of aluminum capacitor foil. W. J. Bernard in Ser. No. 155,728 filed June 2, 1980 teaches removal of copper from the surface of aluminum foil by low voltage anodization in sodium potassium tartrate or ammonium phosphate.

SUMMARY OF THE INVENTION

In accordance with this invention, nodular copper is removed from the surface of aluminum foil by contacting the foil with a 0.1 to 2.0 M solution of ammonium persulfate so as to dissolve the nodular copper.

The usefulness of this invention has been demonstrated by experiments involving the examination of smooth aluminum foil surfaces with a scanning electron microscope (SEM). Aluminum foil samples were electropolished to provide a flat surface for SEM analysis. The samples were chemically etched with nitric acid, with and without added copper. Nitric acid was chosen as the etchant because aluminum surfaces remain relatively flat after etching in nitric acid. A large amount of copper, approximately 20 ppm $Cu^{++}$, was added to the nitric acid to ensure deposition of copper nodules. Foil thus treated was compared with foil treated with nitric acid alone as a control for background copper exposed by etching.

The foil samples were then treated with ammonium persulfate solution and re-examined. The copper nodules were removed, but the monolayer was either not dissolved or if dissolved, replated on the surface immediately.

BRIEF DESCRIPTION OF THE DRAWINGS

The Figures are scanning electronmicrographs at 2000X magnification.

DESCRIPTION OF THE PREFERRED EMBODIMENTS

Figure 1A:
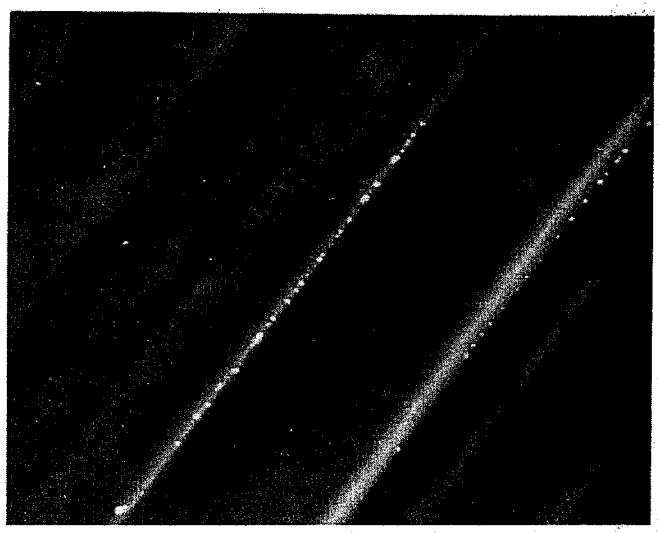
FIGS. 1a and 1b show 99.99% purity aluminum foil samples before and after treatment to remove nodules.
Figure 1B:
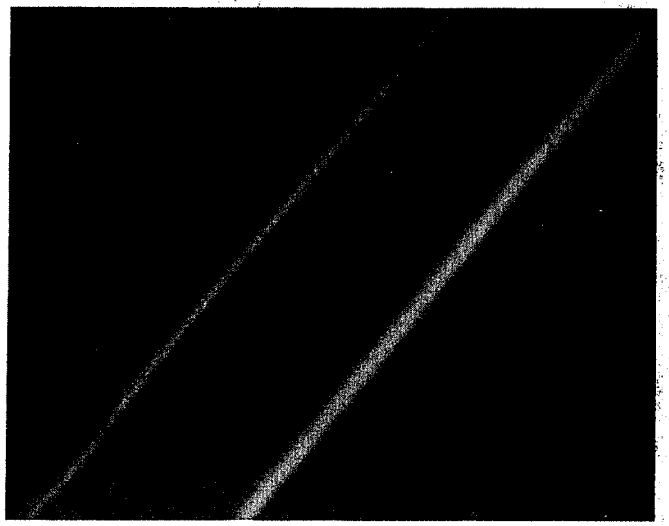

FIG. 1a shows 99.99% purity aluminum foil on which copper has been deposited as nodules mainly along rolling lines or grain boundaries. The copper nodules are the white, spherical masses. FIG. 1b is a phtograph of the same foil after immersion in 0.8 M ammonium persulfate solution at 30° C. for 2 minutes, showing the removal of the nodules.

Figure 2A:
FIGS. 2a and 2b show 99.45% purity aluminum foil samples before and after treatment to remove nodules.
Figure 2B:
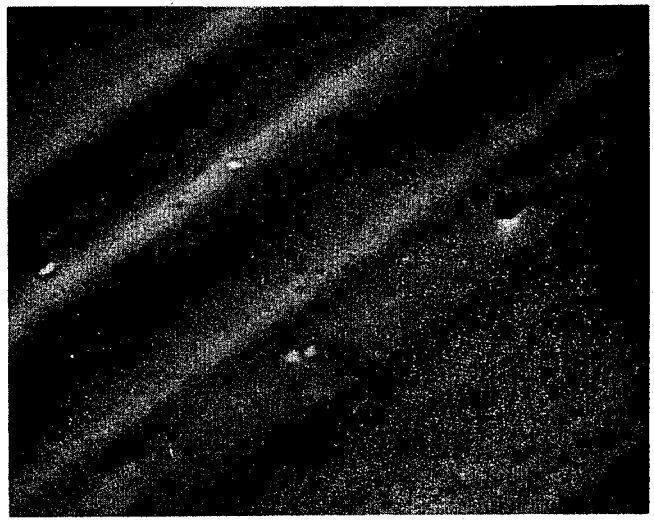

FIG. 2a shows 99.45% purity aluminum foil on which nodules have been deposited. With the lower purity foil, the distribution is more random. FIG. 2a shows this same foil after treatment with ammonium persulfate as above. The light gray patches are an iron-aluminum alloy.

Table 1 below gives the average results by electron probe microanalysis of background copper, the amount of copper on the foil after deposition of the nodules but befor treatment with 0.8 M ammonium persulfate at 30° C. for 2 minutes, and after such treatment.

TABLE 1

| Foil Sample | Background copper, wt % | Cu content before treating, wt % | Cu content after treating, wt % |
|---|---|---|---|
| 99.99% Al | 0.03 | 0.16 | 0.05 |
| 99.45% Al | 0.30 | 0.42 | 0.30 |

The copper level after treatment is about the background copper level of polished foil. The ammonium persulfate removes nodular copper but has no apparent effect on the monolayer deposited during etching.

The effect of ammonium persulfate treatment on capacitance and the effect of treating temperature was investigated. Table 2 shows the average results for 99.45% purity cathode foil that was electropolished (EP) or electroetched (EE).

TABLE 2

| Sample | Temperature °C. | Time, min. | % Change in Capacitance |
|---|---|---|---|
| EP | 30 | 2 | +1.9 |
| EP | 80 | 2 | −20.1 |
| EE | 30 | 2 | +5.3 |
| EE | 30 | 10 | +5.8 |
| EE | 40 | 2 | +3.0 |

As the temperature increases, there is a loss in capacitance and indications of chemical attack of the etch structure. Increasing the treating time did not substantially affect the results.

The preferred temperature range is 20° to 40° C., with 30° C. as the most preferred. Since 20° C. is approximately ambient temperature, operating below this temperature requires expensive cooling equipment. At above 40° C., the capacitance of the foil falls off and damage to the foil by the persulfate solution begins.

Treating times of 1 to 10 minutes are preferred. Below 1 minute treating time, it is necessary to raise the temperature and damage to the foil can result. More than 10 minutes is impractical from a manufacturing standpoint.

While the preferable concentration of the persulfate solution is 0.8 M, depending on the time and temperature conditions wanted, the concentration can be varied from 0.1 to 2.0 M.

What is claimed is:

1. A process for removing nodular copper from the surface of etched aluminum foil comprises contacting said foil bearing a thin uniform copper layer and nodular copper with a 0.1 to 2.0 M ammonium persulfate solution to selectively dissolve said nodular copper and leave said uniform layer.

2. A process according to claim 1 wherein the temperature at which said contacting takes place at 20° to 40° C.

3. A process according to claim 2 wherein said temperature is 30° C.

4. A process according to claim 2 wherein the duration of said contacting is 1 to 10 minutes.

5. A process according to claim 4 wherein said duration is 2 minutes.

6. A process according to claim 1 wherein said ammonium persulfate solution is 0.8 M.

* * * * *